Aug. 26, 1952     H. W. RONFELDT     2,608,444
WHEEL STRUCTURE
Filed Sept. 14, 1946     3 Sheets-Sheet 1
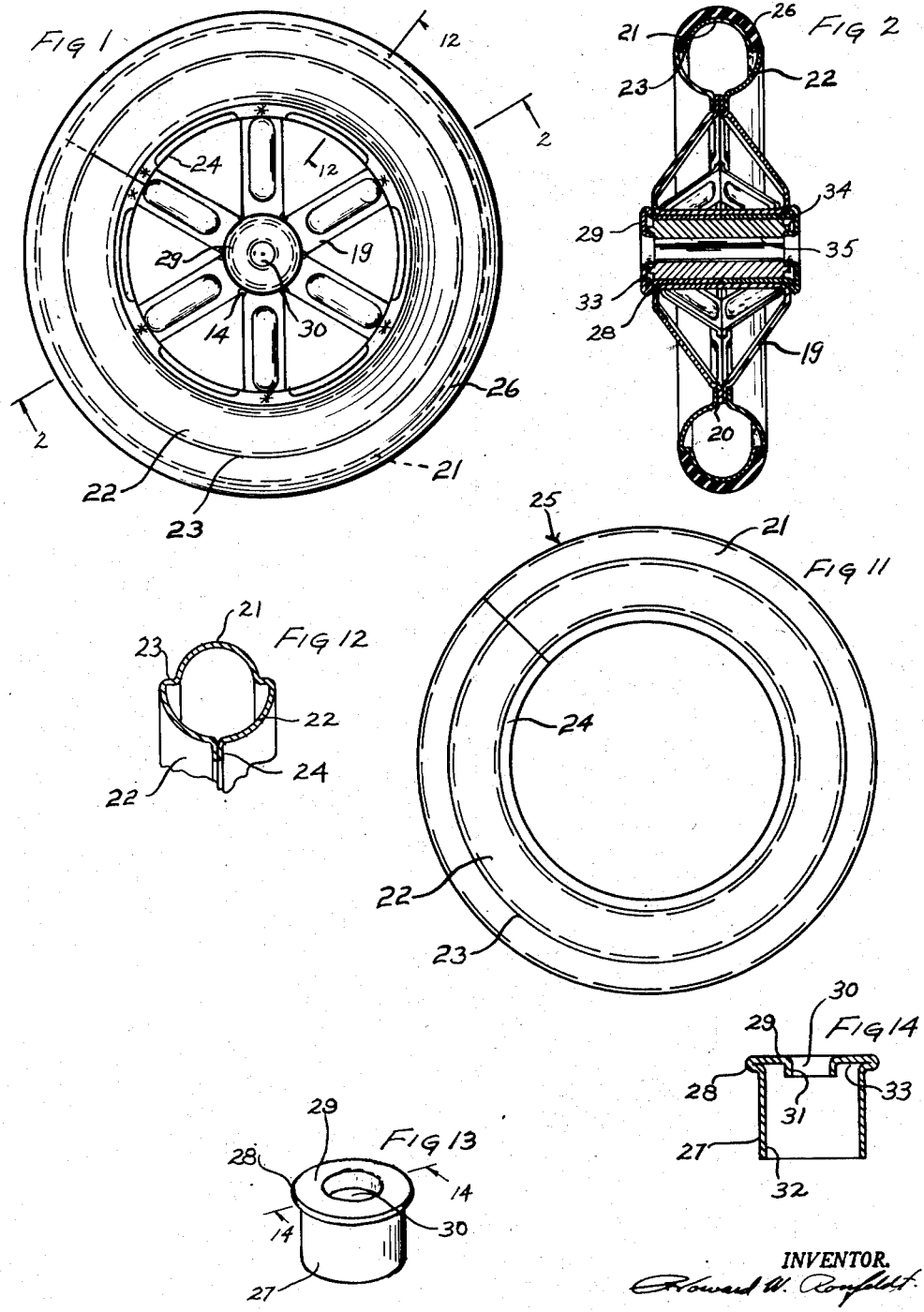
INVENTOR.
Howard W. Ronfeldt Aug. 26, 1952     H. W. RONFELDT     2,608,444
WHEEL STRUCTURE
Filed Sept. 14, 1946     3 Sheets-Sheet 2
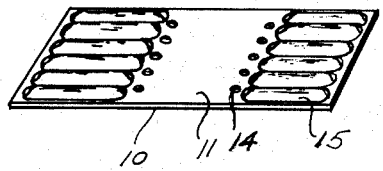
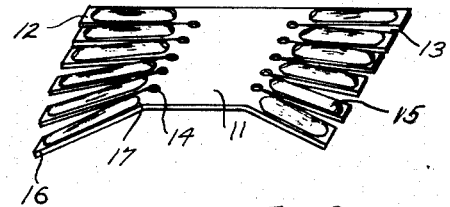
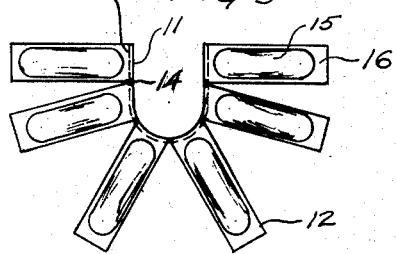
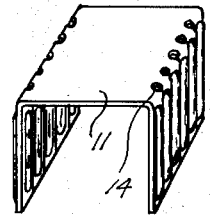
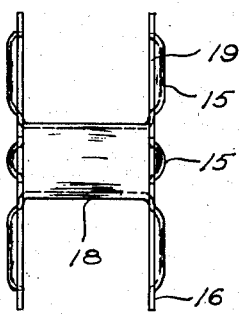
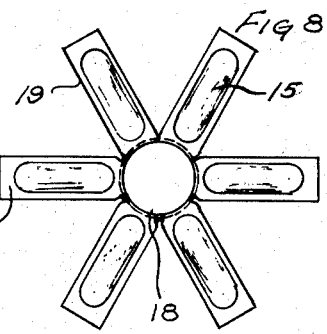
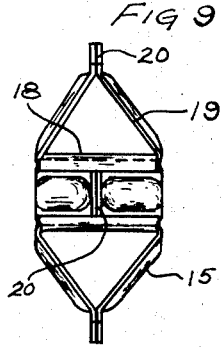
INVENTOR.
Howard W. Ronfeldt Aug. 26, 1952     H. W. RONFELDT     2,608,444
WHEEL STRUCTURE
Filed Sept. 14, 1946     3 Sheets-Sheet 3
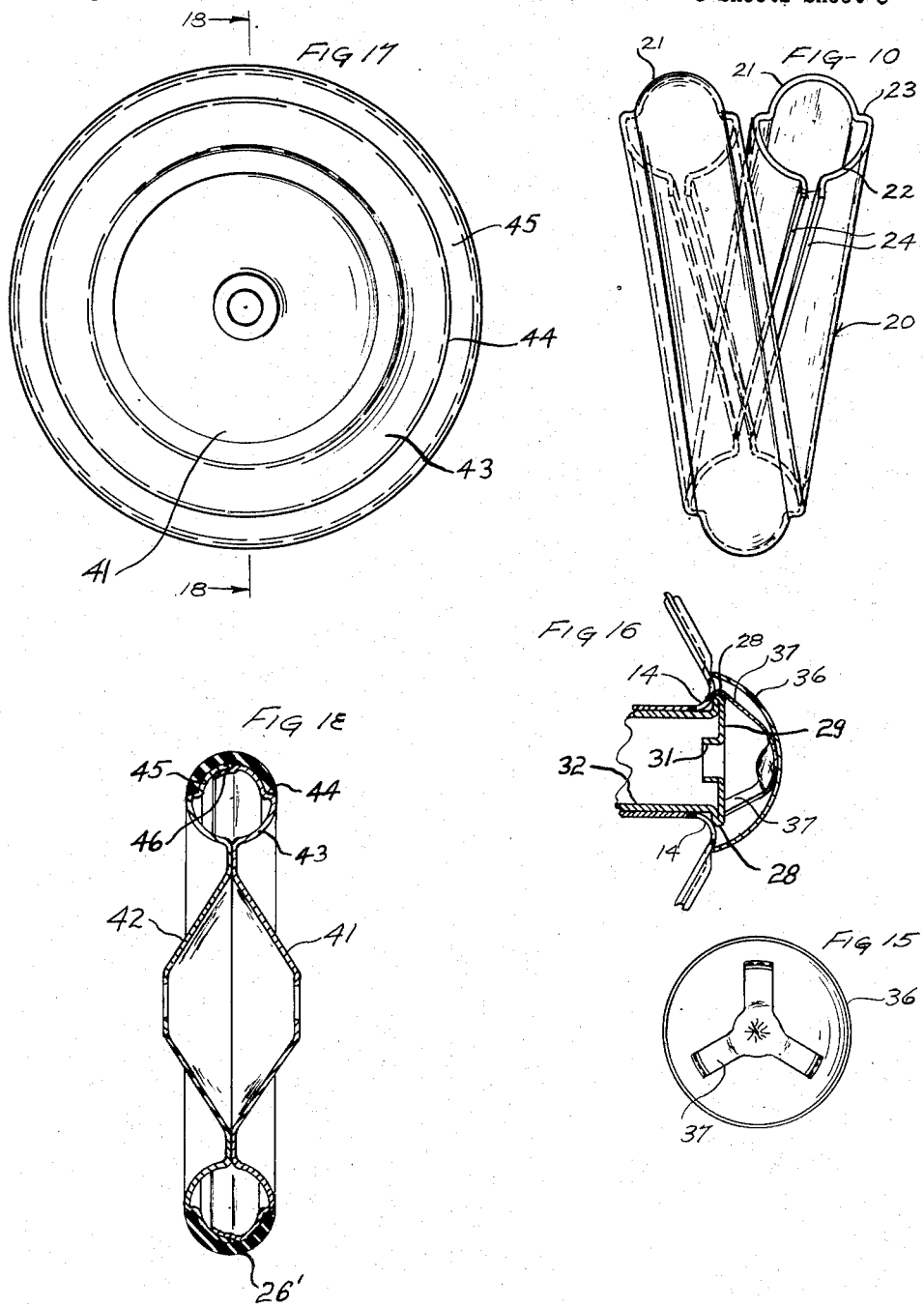
INVENTOR.
Howard W. Ronfeldt Patented Aug. 26, 1952

2,608,444

UNITED STATES PATENT OFFICE 2,608,444

WHEEL STRUCTURE

Howard W. Ronfeldt, Toledo, Ohio

Application September 14, 1946, Serial No. 697,034

3 Claims. (Cl. 301—64)

This invention relates to wheels and their method of manufacture and especially to metallic wheels with or without tires for use with toys, movable furniture, conveyors and as the rotatable member on other wheeled structures.

It is a matter of common knowledge that considerable importance and expense of children's toys, vehicles, conveyor devices, and roller mounted furniture and the like are attributed to their wheel structures. It is, therefore, a desideratum to provide a balanced wheel that can be readily assembled from relatively few cooperating parts formed economically and without excessive material waste into an attractive, durable, and light weight unit having a rim coutoured especially replaceably to mount a simple resilient strip as a tire, but which is attractive and serviceable even without the tire. This then forms a principal object of this invention.

Another object is to produce an improved wheel having a hub with radiating spokes produced without waste from a single sheet of metal and adapted to receive a simple and new roller bearing hub assembly and a tubular sheet metal rim contoured suitably for tractional use by itself or replaceably to mount a thin-walled tire.

A further object of this invention is to produce an improvement in wheel rims of a curvilinearly contoured periphery not only to impart attractiveness, but of a configuration which in itself serves to operate as the traction surface and which is particularly adapted replaceably to mount a resilient band as a tire.

A still further object is to produce an improved and simple hub assembly consisting of stamped sheet metal parts adapted to cooperate with a hub housing of the type described rotatably to mount a series of roller bearings in an annular row and to receive removable hub caps in snapping engagement.

These as well as other objects and advantages will hereinafter appear and for purposes of illustration but not of limitation, embodiments of the invention are shown in the accompanying drawings, in which Figure 1 is a front elevational view of a wheel embodying this invention;

Figure 2 is a sectional elevational view taken along the line 2—2 of Figure 1;

Figures 3 to 9 inclusive illustrate the steps in the fabrication of the hub and spokes from a single sheet of metal;

Figure 10 is a fragmentary view of one convolution of a tubular metallic strip contoured to form a wheel rim;

Figure 11 is a side elevational view of the completed rim before assembly;

Figure 12 is a sectional elevational view taken along the line 12—12 of Figure 1, showing the rim contour without a tire;

Figure 13 is a perspective view of a bearing sleeve forming a part of the hub assembly;

Figure 14 is a sectional elevational view taken along the line 14—14 of Figure 13;

Figure 15 is a rear elevational view of the hub cap;

Figure 16 is a fragmentary sectional elevational view of the hub cap in the mounted position;

Figure 17 is a view of another form of the wheel shown without a tire; and

Figure 18 is a sectional elevational view taken along the line 18—18 of Figure 17, showing a tire in cross section in the mounted position.

Referring now principally to the hub and spoke sections, heretofore in the manufacture of disc or spoke wheel bodies by pressing and cutting from a square sheet of metal, intolerable metal wastage has resulted including the discarded corner portions and the area between the spokes. I have made such improvements in wheel manufacture as will enable the fabrication process to be performed more simply, accurately and without excessive metal waste or strain from a single sheet of metal to produce a balanced and durable hub and spoke section particularly adapted to receive an improved hub assembly and rim section.

As illustrated in Figures 3 to 9 inclusive, there is provided a rectangular blank 10 of sheet metal having a width substantially equal to the circumference of the desired hub housing and a length determined selectively to conform to the size of the desired wheel. The blank is subdivided into a central body or hub forming portion 11 and a plurality of outwardly extending parallel strips 12 by a series of equidistant parallel cuts 13 running lengthwise from each end of the blank and terminating as apertures 14 arranged in two parallel rows defining the body portion. For purposes of rigidity, each strip may be centrally embossed, as at 15, with allowances of unembossed portions 16 and 17 respectively at each end for forming purposes later to be described.

The shearing, punching and embossing described might be performed in a single or a series of operations, such as stamping, and in the same or in an additional operation, the blank is subjected under pressure to suitable dies whereby the embossed parallel strips 12 are bent toward each other along a line formed by the aperture centers until they depend substantially perpendicular from the body portions, as illustrated in Figure 6, or else until the ends thereof almost meet.

Thereafter, the blank is rolled into a cylindrical bushing or hub housing 18 which concomitantly causes the parallel strips 12 to extend radially as equiangularly and circumferentially spaced spokes 19, as illustrated in Figures 7 and 8. It is in this operation that the importance is directed to the apertures 14 for otherwise, not only would the rolling operation be rendered more difficult and cause the hub section end portions to be out of round, but, when rolled into the cylindrical section, the metal between each strip and hub section is stretched, and without the apertures as placed, the stretch is insufficient without causing considerable strains to be set up which invariably results in the splitting of the metal further into the hub section greatly to affect the strength and rigidity of the resulting structure. The respective spokes 19 extending radially from each end of the cylindrical hub housing 18, if not previously bent so as to meet, are thereafter further inturned so that their end portions 16 may be pinched together as a lip 29. Thus there is formed a rigid and strong integral hub and spoke assembly as illustrated in Figure 9.

To the outer ends of each lip there may be joined, as by welding, a metallic ring of variable contours to form a wheel rim. However, in part, as an object of this invention, it is more expedient to provide a rim member preferably in the form of a hollow tube having the appearance of a pneumatic tire, and which, in addition, is attractively contoured especially to impart rigidity and strength and provide a reinforced surface adapted either to be used by itself for traction or operation purposes, or else readily and replaceably to mount a tire in the form of an expansible band formed of a minimum of resilient material.

For this purpose, a strip of sheet metal is rolled into an annular rim, or preferably, as illustrated in Figure 10, a substantially continuous strip of sheet metal may be simultaneously rolled and formed by well known standardized metal processing machines into a tubular coil 20 having convolutions of a diameter equal to the desired rim. It is of importance to provide in the rim a protuberance or annular bulbous portion which in cross section appears polygonal or convex adapted by itself to form the traction surface and also when desired firmly to mount the tread in the form of a band of expansible material as a replaceable tire hereinafter described. With a view towards strength and appearance the rim contour in cross section may be formed of outer and inner convexo-convex surfaces of small and larger area respectively such for example as facing outer and inner semi-circular sections 21 and 22 of small and large diameter respectively laterally joined to each other by integral flanges 23. The lateral ends of the rolled metal strip might be secured together when mounted on a disc type wheel, but for assembly with a spoke wheel, the lateral ends 24 are adapted to extend inwardly from the base of the inner curvilinear section 22 as a pair of spaced annular flanges in parallel relation.

By cutting through the aligned tubular sections, the coil 20 is subdivided into multiple tubular rings that are formable into wheel rims 25 merely by joining the severed ends together, as by butt welding, or other metal joining means. Thereafter, the wheel rim 25 is positioned so that the lips 29 of each spoke member is disposed between the spaced annular flanges 24 which are then pressed together all around tightly to grasp each enclosed lip, further to be secured in the assembled relation as by spot welding, riveting or the like, to form a wheel.

The integrally joined semi-circular or arcuate sections not only affect the appearance of a pneumatic wheel, but each cooperates with the other in a manner to strengthen the rim structure, enabling the use thereof without modification as a rim on traction wheels for wagons, bicycles or the like, without fear of collapse or deformation. However, for purposes of wear and silence in operation, it is expedient to cover part or all of the outer section with resilient rubber-like material, such, for example, as an expandable tire in the form of a band 26 having a diameter less than that of the rim structure with a width and thickness preferably in the range of the periphery of the outer sector 21 and the width of the flanges 23 respectively, so that when the rubber-like band is in the mounted position, it is deformed tensionably to grip the outer periphery of the outer section 21 and appear as a continuous extension of the inner rim section 22.

It is apparent that an attractive and firm assembly is obtainable with the use of a readily available band manufactured as by joining the ends of a rubber-like strip containing only a minimum of material selectively distributed. In addition, when the tire has been worn down, it is unnecessary to discard the toy or wheel, as the case may be, for, as previously pointed out, the wheel may be used thereafter either without the tire or else the worn tire may be removed and replaced merely by stretching a new band over the rim section.

When the wheel is used as the traction member, rotational movement is enhanced by the disposition of anti-friction means between the hub housing 18 and the supporting axle. For this purpose, it is expedient to provide a pair of cup-like members 27 formed as by stamping, shaping or upsetting a cylindrical sleeve adapted slidably to seat in the hub housing. Each cup-like member has an annular ridge 28 integral with an end closing disc 29 having a central aperture 30 slightly greater than the diameter of the axle and an annular flange 31 extending inwardly a short distance from the peripheral edge of the aperture, the flange ordinarily being formable from the metal material struck from the disc 29.

Between the wall 32 of the cup-like member 27 and the annular flange 31, there is formed an annular groove 33 which functions as a race adapted to receive pins 34 extending concentrically from cylindrical rollers 35 which have a diameter greater than the distance between the wall 32 and the flange 31 and an overall length substantially greater than that of the hub housing, so that the pins ride in the grooves disposed at each end of the hub when the cup-like members are inserted in the mounted position. In the mounted position, the rollers are adapted to define a cylindrical section slightly less than that of the aperture 30 and to ride on inner walls 32 of the cup-like members which are of a length substantially to extend within the hub section or selectively to meet when the ridge 28 of each member abuts the ends of the hub housing 18 through which each cup-like member respectively is inserted.

Covering the cup-like section 27 which is outwardly disposed when the wheel is in the mounted position, is a hub cap 36 in the form of an annular disc of variable cross sectional contour. Three or more inwardly extending curvilinear spring fingers 37 are arranged in an annular row in a manner to snap over the ridge 28 when urged axially thereagainst, thereby tensionably to secure the hub cap in the mounted position. Additional anchorage and rotational movement of the hub cap on the cup-like member is prevented by the entrance of the fingers into the grooves in the hub section formed by the apertures 14 previously described. Thus, rattling noises as an incidence to wheel movement are simply and effectively prevented.

Another form of wheel suitable for the purposes described, and illustrated in Figures 17 and 18, consists of a pair of mating outer and inner formed discs 40 and 41 respectively. Since patentable invention is not directed to the formation of a metal disc wheel, it being understood that a wooden disc is equally adaptable, detailed description thereof is considered unnecessary.

As illustrated, the annular end portion of each disc is formed in the shape of an inner quarter sector 43 of larger diameter joined by a flange 44 to other concentric quarter sector 45 of smaller diameter. In the assembled relation, the ends of the sectors of smaller diameter might be secured together as by butt welding or else one of the sectors may be provided with an embossed flange 46 adapted to engage the underside of the other sector for joining purposes as by riveting, spot welding or the like, thus to provide a rim contour of outer and inner semi-circular sections joined by lateral flanges as previously described with reference to the spoke wheel.

In instances where only a wooden discs is used for the central body portion of the wheel, a metallic strip formed, as by a rolling operation, into a contour of outer and inner arcuate sections as described, might be secured to the periphery of the wooden disc to provide a traction surface with or without a mounted tire as described.

From the above description, it is apparent that I have produced a new and improved wheel having many novel features of construction, operation and arrangement, such, for example, as the greatly simplified fabrication of an integral, strain-free and strong hub and spoke assembly of a single sheet of metal with only negligible material waste and embodying uniform distribution of strength, weight and enabling variability of wheel size; a rim contour having the appearance of a pneumatic wheel and the strengthening characteristics to enable use as a traction surface without fear of breakdown and also to mount a tire in the form of a thin-walled band readily replaceable by an unskilled person; and a hub assembly which is simply fabricated and adapted to be mounted in the hub housing to position anti-friction bearings and a hub cap removably urged toward the mounted position.

It is to be understood that numerous changes may be made in the details of construction, arrangement and operation without departing from the spirit of the invention especially as defined in the appended claims.

What I claim is:

1. A wheel comprising a rigid central body portion having an intermediate hub housing, a tubular rim of facing inner and outer substantially semi-circular sections of large and small diameter respectively integrally joined by lateral flanges, means operatively engaging said hub housing for mounting anti-friction members in an annular row within said housing including a pair of tubular members of a length less than one-half the width of the hub housing and fitting in same, an inwardly extending annular flange integral with one end portion of each tubular member and a sleeve section depending from the inner end of said flange in substantially parallel relation with the tubular member forming a race therebetween for the anti-friction members, and an annular shoulder on each tubular member adapted to abut the hub housing when in the assembled relation, and concealing means removably mounted on said first means.

2. A wheel comprising a rigid central body portion having an intermediate hub housing, a tubular rim of facing inner and outer substantially semi-circular sections of large and small diameter respectively integrally joined by lateral flanges, means operatively engaging said hub housing for mounting anti-friction members in an annular row within said housing and concealing means including an annular disc, and multiple spring fingers arranged in an annular row on one face of said disc adapted to engage the means mounting the anti-friction members.

3. In a pressed sheet metal wheel formed with a central tubular hub section and integral spokes extending radially therefrom, a housing for anti-friction bearings comprising a pair of aligned tubular members tightly fitting into said hub section from opposite directions and an end portion integral with each tubular member formed with an annular shoulder extending radially of the tubular section adapted to abut the edge wall of the hub section when in the assembled relation and an inwardly extending concentric flange integral with and spaced from the tubular section to form a race for receiving anti-friction members, and a hub cap including a cup-shaped section, and multiple grip fingers in spaced apart relation on the inner wall of the cup-shaped section adapted releasably to grip the annular shoulder on the annular portion of the tubular member when in the assembled relation.

HOWARD W. RONFELDT.

REFERENCES CITED

The following references are of record in the file of this patent:

UNITED STATES PATENTS

| Number | Name | Date |
| --- | --- | --- |
| 1,231,734 | Harmon | July 3, 1917 |
| 1,232,081 | Potter | July 3, 1917 |
| 1,242,277 | Vogel | Oct. 9, 1917 |
| 1,320,999 | Baker | Nov. 4, 1919 |
| 1,336,333 | Anglada | Apr. 6, 1920 |
| 1,357,615 | Copeland | Nov. 2, 1920 |
| 1,366,047 | Wright | Jan. 18, 1921 |
| 1,490,592 | Cromwell | Apr. 15, 1924 |
| 1,525,171 | Dodds | Feb. 3, 1925 |
| 1,567,638 | Dean | Dec. 29, 1925 |
| 1,809,605 | Sauzedde | June 9, 1931 |
| 1,932,289 | Jarvis | Oct. 24, 1933 |
| 2,013,895 | Pannecoucke | Sept. 10, 1935 |
| 2,085,647 | Freeman | June 29, 1937 |

FOREIGN PATENTS

| Number | Country | Date |
| --- | --- | --- |
| 1,542 | Great Britain | 1913 |
| 166,526 | Great Britain | 1922 |
| 273,513 | Great Britain | July 7, 1927 |
| 799,461 | France | June, 1936 |